United States Patent
Schroeder

[11] 3,904,301
[45] Sept. 9, 1975

[54] HUB LOCKING ARRANGEMENT
[75] Inventor: Earle E. Schroeder, New Richmond, Ohio
[73] Assignee: Allis-Chalmers Corporation, Milwaukee, Wis.
[22] Filed: July 24, 1974
[21] Appl. No.: 491,358

[52] U.S. Cl. .............. 403/259; 403/320; 403/343
[51] Int. Cl.² ......................................... F16D 1/06
[58] Field of Search .......... 403/258, 259, 260, 320, 403/343

[56] References Cited
UNITED STATES PATENTS
| 134,485 | 12/1872 | Poage | 403/259 |
|---|---|---|---|
| 1,063,790 | 6/1913 | Greaves | 403/259 |
| 2,353,431 | 7/1944 | Arden | 403/260 X |

FOREIGN PATENTS OR APPLICATIONS
| 695,842 | 8/1953 | United Kingdom | 403/258 |

Primary Examiner—Andrew V. Kundrat
Attorney, Agent, or Firm—John P. Hines

[57] ABSTRACT

An arrangement for locking an internally threaded pump impeller hub to the end of a threaded shaft which includes a second thread on the shaft of a different hand than the internal thread of the impeller hub. A lock nut or other threaded means engages the second thread and also the impeller hub. The first thread is of a hand whereby the impeller hub is normally urged in a tightening direction due to the normal load on the impeller and the second thread is of a hand such that the threaded means engaging the hub is normally urged in a tightening direction upon a reversal of the load on the impeller.

1 Claim, 3 Drawing Figures

HUB LOCKING ARRANGEMENT

This invention pertains in general to shaft and hub attaching means and more particularly to a means for threadably locking a hub on a rotating shaft.

In many instances, it is desirable to attach a rotating hub, such as a pump impeller, to a rotatable shaft by means of a threaded connection. The threaded connection between the impeller and the shaft is of a hand such that the load imposed on the impeller has a tendancy to tighten it on the shaft. This arrangement provides a simplified and reliable connection between a pump impeller and a shaft. One of the advantages of such an arrangement is that the impeller can be removed and replaced without damaging the connection.

There are applications of this type of connection, however, where a reversal of the load on the impeller frequently occurs. In these instances, the normal tendancy to tighten the impeller hub on the shaft is reversed and the impeller can be loosened thereby creating vibrations and possible damage to the pump. To overcome this, many different locking devices are provided. Some of these locking devices are extremely reliable such as providing a weld between the hub and shaft or a pin between the hub and the shaft. However, locking devices such as these are difficult to overcome when it is desired to remove the impeller or require special equipment for removal.

It is, therefore, the intention and general object of this invention to provide a locking device for a threaded hub or impeller which provides a positive lock and yet is easily removed when removal of the impeller is required.

A further object of the subject invention is to provide a threaded locking device for a threaded hub wherein the threaded direction of the locking device is such that it is tightened upon rotation of the hub opposite to its normal direction of rotation.

A more specific object of the subject invention is to provide a threaded locking device of the hereinbefore described type wherein there are two opposite hand threads associated with the rotatable shaft, one of which receives a threaded hub, the other of which receives a threaded locking member which engages the hub to hold it against axial movement.

These and other objects of the invention will become more fully apparent as the following description is read in light of the attached drawings wherein.

Figure 1:
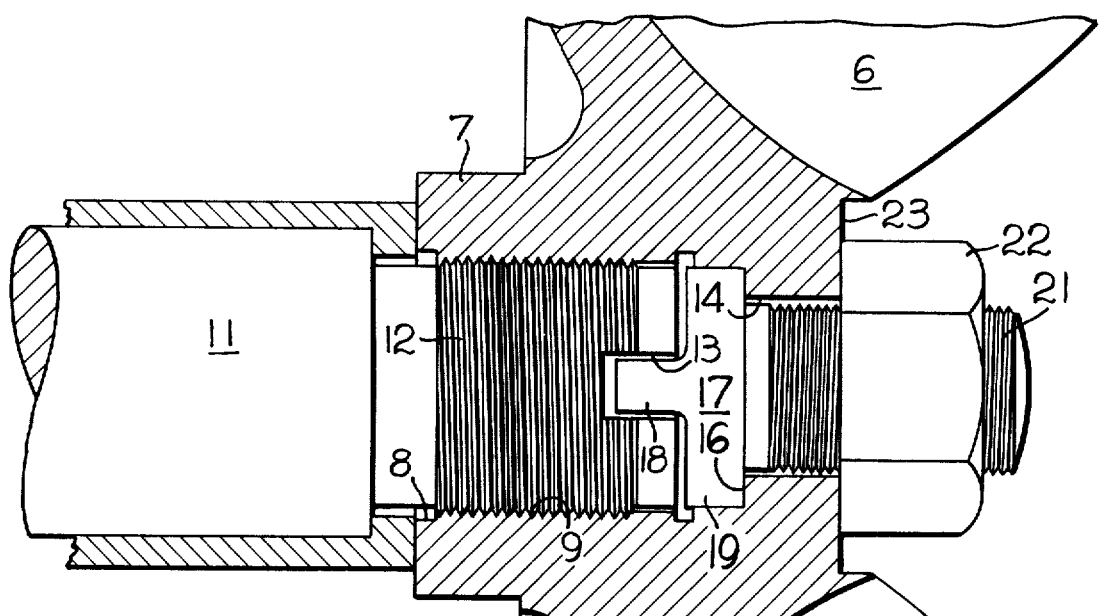
FIG. 1 is a partial view in section showing one embodiment of the subject invention.

The invention is herein described in connection with a pump impeller. However, it should be understood that the invention does have application to any connection between a hub and a rotatable shaft.

Referring to the drawings wherein like reference characters indicate the same or similar parts, a pump impeller is shown generally indicated at 6. The impeller 6 is provided with a hub 7 having an opening 8 extending therethrough. The opening 8 has an internal thread 9 which extends through a portion of the hub length.

Referring now to FIG. 1, the embodiment shown herein includes a rotatable shaft 11 having a threaded portion 12 on the end thereof. This threaded portion would be right or left hand depending on the direction of the load on the impeller such that under normal operating conditions the impeller load would have a tendancy to tighten the internal thread 9 in the hub onto the external thread 12 on the shaft. The end surface of the shaft 11 is provided with a slot 13. The hub opening 8 in this embodiment is stepped and has a reduced diameter opening 14. The junction between the two opening diameters forms an annular shoulder 16.

Locking means in the form of a threaded stud 17 has a tongue 18 thereon which engages the slot 13 to prohibit relative rotation between the stud 17 and the shaft 11. The stud 17 is also provided with an annular flange 19 which mates with the shoulder 16 of the hub. Additionally, the stud has a threaded portion 21 which extends through the smaller diameter opening 14 to the exterior of the hub. This threaded portion 21 is of a hand opposite to the hand of the threaded portion 12 on the shaft. A nut 22 is turned onto the threaded portion 21 into engagement with the surface 23 of the hub 7 forcing the shoulder 16 and flange 19 into firm engagement. With this arrangement, upon normal operation of the pump, the threaded connection between the shaft thread 12 and the hub thread 9 is urged in a tightening direction. However, since the threaded connection between the nut 22 and the thread 21 is of an opposite hand any reversal of load tending to loosen the shaft hub connection would be resisted.

Figure 2:
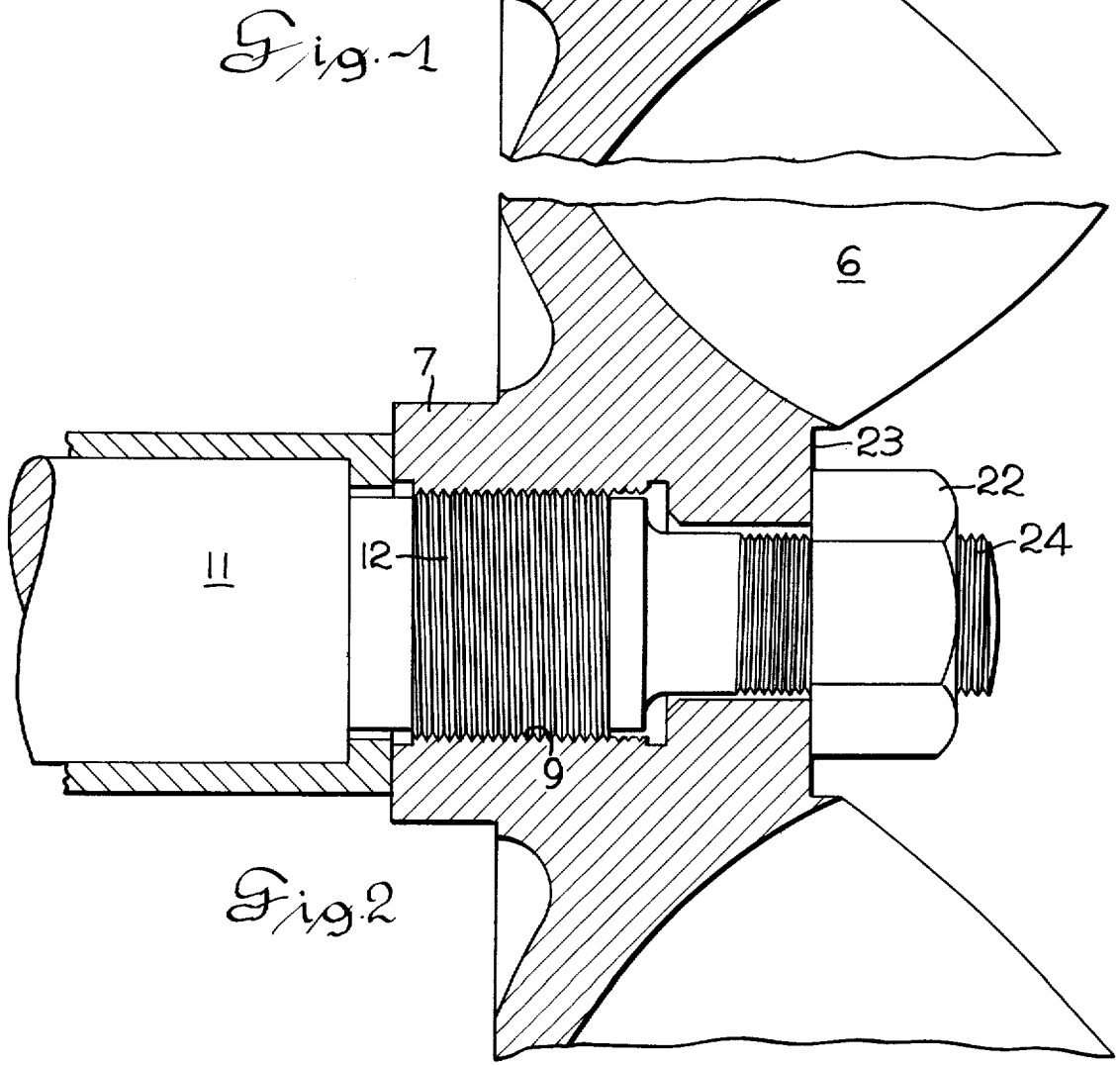
FIG. 2 is a partial view in section showing a different embodiment of the subject invention.

Referring to FIG. 2, the shaft 11 is provided with a first thread 12 and a second axially spaced thread 24. These threads are similar to that disclosed in FIG. 1. The nut 22 is turned onto the threaded portion 24 into engagement with the hub surface 23. In the same manner as that described in FIG. 1, in case of a reversal of load, the tendancy to loosen the threaded connection between the threads 9 and 12 is resisted by the opposite hand threaded connection between the nut 22 and the threaded portion 24.

Figure 3:
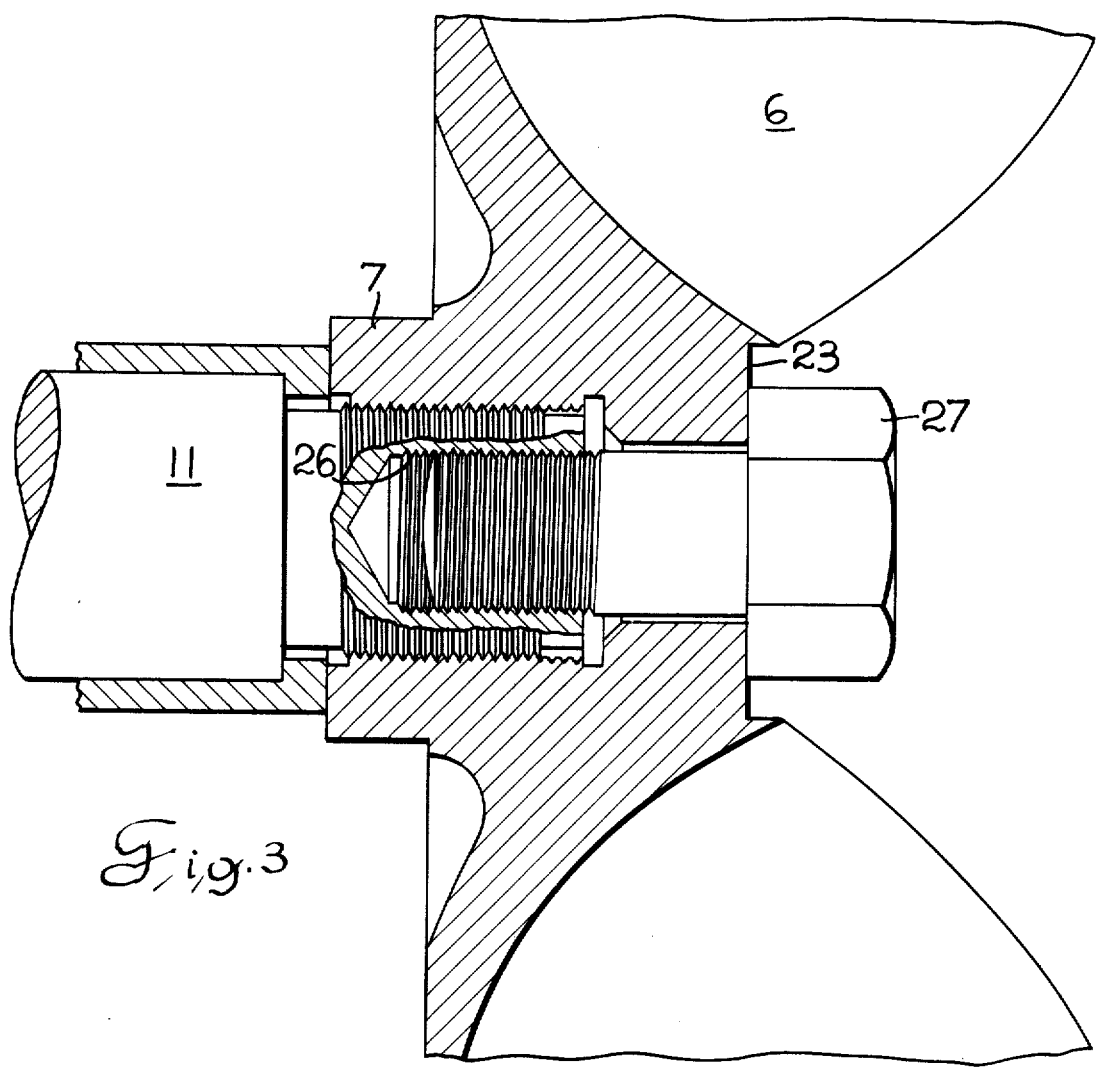
FIG. 3 is a partial view in section showing still an additional embodiment of the subject invention.

FIG. 3 is a further embodiment of the invention with an opposite hand thread being in the form of an internal thread 26 provided in an axially extending opening in the end of the shaft 11. In this arrangement, rather than a nut 22 as utilized in FIGS. 1 and 2 a cap screw 27 is threaded into the axially extending internally threaded opening 26 with the cap screw head engaging the surface 23 of the hub to prevent loosening upon reversal of load.

The embodiments of the invention in which an exclusive property or privilege is claimed are defined as follows:

1. The combination of a hub releasably attached to a rotatable shaft comprising: walls defining a stepped opening through said hub of two different diameters with an annular shoulder defined by the junction between said different diameters; an internal thread formed on the larger diameter portion of said opening; a thread on the end portion of said shaft of the same pitch and hand as said internal thread, said hub being threaded onto said shaft; locking means having an annular flange contacting said shoulder and including a threaded portion extending through said hub opening of smaller diameter and terminating on the exterior of said hub remote from said shaft, said threaded portion of said locking means having a different hand thread than said shaft thread; means releasably connecting said locking means to said shaft to prohibit relative rotational movement therebetween; and a nut threaded onto the threaded portion of said locking means on the exterior of said hub and engaging the surface of said hub.

* * * * *